Dec. 14, 1965 E. WITTWER 3,223,900

SEMICONDUCTOR RECTIFIER DEVICES WITH TABLET-SHAPED RECTIFIER ELEMENTS

Filed Aug. 23, 1961

Inventor:

Erwin Wittwer 3,223,900

SEMICONDUCTOR RECTIFIER DEVICES WITH TABLET-SHAPED RECTIFIER ELEMENTS

Erwin Wittwer, Berlin-Lubars, Germany, assignor to Siemens-Schuckertwerke Aktiengesellschaft, Berlin-Siemensstadt, a corporation of Germany Filed Aug. 23, 1961, Ser. No. 133,434
Claims priority, application Germany, Aug. 25, 1960, S 70,070
2 Claims. (Cl. 317—234)

My invention relates to semiconductor rectifier devices that are composed of stacks or columns of individual tablets, pellets, discs, or the like, particularly of miniature size for use with printed circuits. Such devices are disclosed in the application of Rudolf Benda and Heinz Schneider entitled Methods of Producing Semiconductor Rectifier Devices From Rectifier Pellets, Serial No. 138,360, assigned to the assignee of this application and filed Sept. 15, 1961.

It is known to use sheet metal-parts as terminal members in contact with the tablet-, disc-, or pellet-shaped rectifier elements, for example selenium tablets of such semiconductor devices. The sheets comprise a plate-like portion and a ribbon-shaped or strip-shaped terminal lug projecting therefrom. The plate-shaped portion has basically the same form as the pellets and affords contact with the latter. For use in printed circuits, these devices have the disadvantage that the ribbon-shaped or band-shaped terminal lugs permit themselves to be easily bent in only two directions, namely at right angles to the strip-shaped surfaces of the lugs. In printed circuits, there is desired of the terminal members a flexibility in all directions rendering it possible to freely insert the terminal member into the borings in the printed-circuit plate and temporarily anchor it there, until the parts are soldered together. For this purpose, rectifier devices with wire-shaped terminal members have been proposed. However, the difficulty arises that the wires cannot form an intimate contact over the surfaces of the rectifier pellets or tablets. In order to obviate this disadvantage, contacting sheet-metal parts with wire terminals welded thereon have been produced. Such welding, however, constitutes additional expenditure during production.

It is an object of my invention to provide a universally flexible contact terminal for rectifiers of the type described while maintaining the desired intimate contact with the individual tablets or pellets.

According to a feature of my invention, I utilize a conventional sheet-metal part comprising a plate-shaped portion contacting the rectifier element and having a band-shaped terminal lug projecting therefrom, and I twist these terminal lugs into a screw or helical shape. The twisted terminal lugs may be bent, similar to wires, in all directions and thereby be readily adapted to previously available printed circuits.

The various features of novelty characterizing my invention are pointed out with particularity in the claims. For a better understanding of the invention, however, reference may be had to the following description and accompanying drawings wherein:

Figure 1:
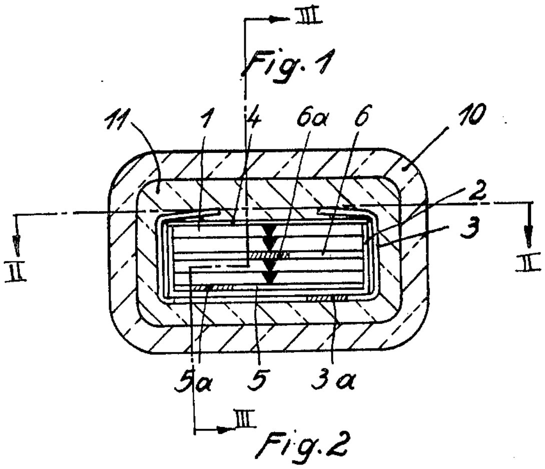
FIG. 1 is a sectional view of a miniature selenium rectifier in voltage double circuits arrangement according to the invention taken along the line I—I of FIG. 2.
Figure 2:
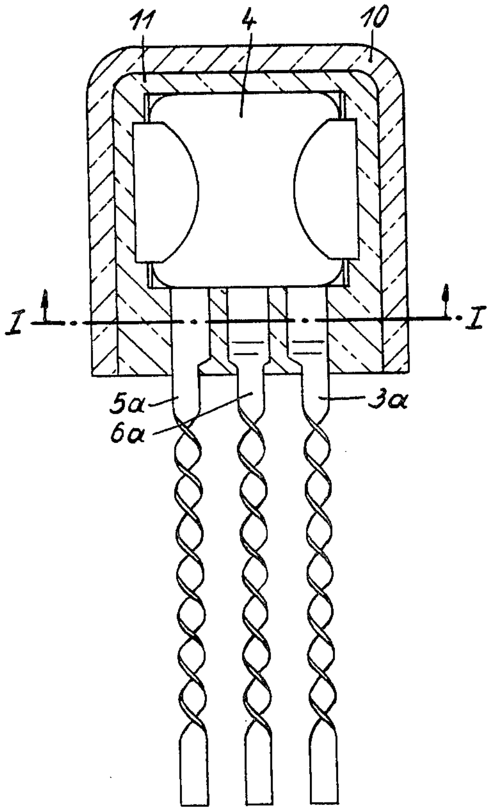
FIG. 2 is a sectional front elevation of the rectifying device in FIG. 1 taken along the lines II—II.
Figure 3:
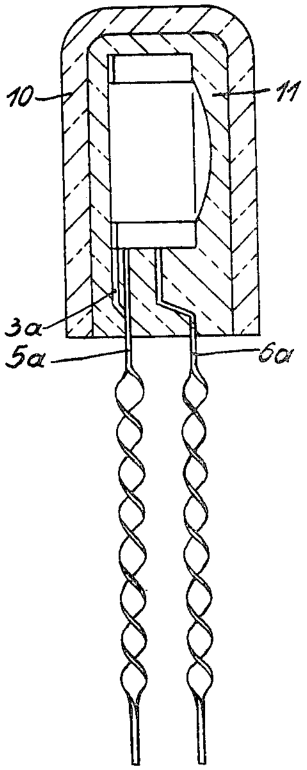
FIG. 3 is a sectional side elevation of the rectifying device in FIG. 1 taken along the section line III—III in FIG. 1.

In FIG. 1, the numeral 1 designates four stacked selenium tablets or pellets forming two pairs of semiconductor elements in series with each other. The tablets or pellets are lodged in a metal clamp 3 which is lined with an insulating foil 2. The insulating foil 2 embraces the bottom and the two side surfaces of the tablet or pellet stack. Upon the pellet stack lies a spring 4 which is compressed by means of the bent-over upper end of the clamp 3. In this manner, the required contact pressure between the stack elements is provided. The clamp 3 exists in contacting connection with the upper tablet or pellet 1 by means of the spring 4 and at the same time serves as a terminal member for which purpose it is provided with a terminal lug 3*a*. On the lower side of the stack of tablets or pellets 1 lies a further sheet-metal part 5 with a terminal lug 5*a* and in the middle of the stack exists a sheet-metal part 6 with a terminal lug 6*a*. As illustrated in FIGS. 2 and 3, the terminal lugs 3*a*, 5*a* and 6*a* are twisted into screw shape. Electrically, the above constitutes a rectifier having four diodes in series with a positive lead constituted by lug 3*a*, a negative lead constituted by lug 5*a* and a mid-point lead constituted by lug 6*a* connected between the second and third consecutive diodes.

The illustrated composite device, as far as described, constitutes a stable and rugged mechanical unit which can be tested with respect to its electrical properties and, if necessary, can be subjected as an entity to an electric forming treatment, often desirable for selenium rectifiers. For many purposes, it will be advantageous to produce the arrangement with a housing for its protection. This can be accomplished in accordance with the example of FIG. 3 in that the device is inserted within an insulating cup 10 or a cup-shaped housing 10 and embedded in a casting resin 11.

Preferably, the distances between the terminal lugs 3*a*, 5*a* and 6*a* are chosen such as to conform to the printed circuit standards, that is to say, corresponding to the norm of 2.5 millimeters or a multiple thereof when employing the present German standard. The width of the terminal lugs should measure approximately 1 millimeter because the diameter of the bores in the circuit plates are set when employing present German standards, at 1.2 millimeters. For further details, reference may be had to the before-mentioned companion application.

While a preferred embodiment of the invention has been described in detail, it will be obvious to those skilled in the art that variations therefrom are possible within the scope of the following claims.

I claim:

1. A semiconductor rectifying device adapted for printed circuits comprising a plurality of pellet-shaped rectifier elements, sheet-metal parts, said sheet-metal parts having plate-shaped portions contacting said rectifier elements, and strip-shaped terminal lugs projecting from said plate-shaped portions, said strip-shaped terminal lugs being twisted into a helical shape and being bendable in all directions.

2. A semiconductor rectifying device adapted for printed circuits comprising a plurality of pellet-shaped rectifier elements, sheet-metal parts, said sheet-metal parts having plate-shaped portions contacting said rectifier elements, and strip-shaped terminal lugs projecting from said plate-shaped portions, and sheet-metal clamp means compressing the pellet-shaped rectifier elements and having a strip-shaped terminal lug projecting therefrom, said strip-shaped terminal lugs being twisted into a helical shape and being bendable in all directions.

References Cited by the Examiner

UNITED STATES PATENTS

| | | | |
|---|---|---|---|
| 2,143,414 | 1/1939 | Grisdale | 317—238 X |
| 2,758,262 | 8/1956 | Geisselsoder | 317—234 |

FOREIGN PATENTS

| | | |
|---|---|---|
| 66,649 | 1/1893 | Germany. |

JOHN W. HUCKERT, *Primary Examiner.*

JAMES D. KALLAM, *Examiner.*